No. 728,776. PATENTED MAY 19, 1903.
J. B. SMITH.
TIRE TIGHTENER.
APPLICATION FILED FEB. 24, 1903.
NO MODEL.
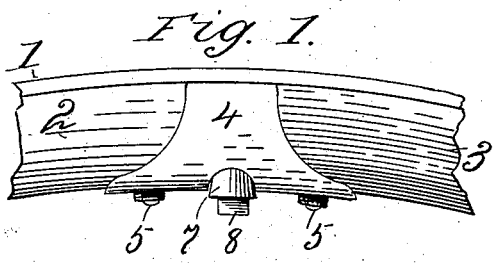
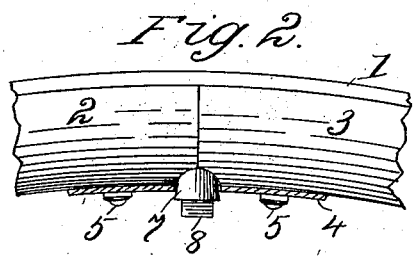
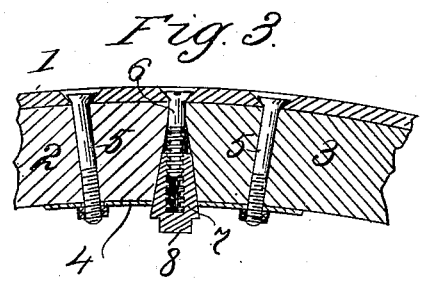
Witnesses.
Nora Graham.
Ina C. Graham.
Inventor.
Joseph B. Smith
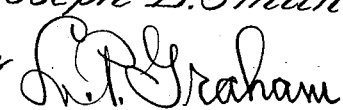
by R. T. Graham
his attorney.

No. 728,776. Patented May 19, 1903.

UNITED STATES PATENT OFFICE.

JOSEPH B. SMITH, OF HAVANA, ILLINOIS, ASSIGNOR OF ONE-HALF TO L. G. PULLEN, OF HAVANA, ILLINOIS.

TIRE-TIGHTENER.

SPECIFICATION forming part of Letters Patent No. 728,776, dated May 19, 1903.

Application filed February 24, 1903. Serial No. 144,884. (No model.)

*To all whom it may concern:*

Be it known that I, JOSEPH B. SMITH, of the city of Havana, in the county of Mason and State of Illinois, have invented certain new and useful Improvements in Tire-Tighteners, of which the following is a specification.

This invention relates to wheels having metal tires and wooden fellies; and the object is to provide simplified and improved means for taking up wear and shrinkage in the fellies.

The invention is exemplified in the structure hereinafter described, and it is defined in the appended claims.

In the drawings forming part of this specification, Figure 1 is a side elevation of a fragment of a rim of a wheel provided with my invention. Fig. 2 is a similar elevation showing the clip in section. Fig. 3 is a section through the fragment of a wheel shown in Figs. 1 and 2.

The tire is shown at 1.

Conjoining ends of felly-sections are shown at 2 and 3.

At 4 is shown a clip of the ordinary or any desired construction. Bolts to hold the clip in place are shown at 5.

At 6 is shown a screw-head bolt, which forms a part of my invention, and at 7 is shown a conical nut which constitutes an essential part of my tire-tightener. The nut 7 has a wrench-bearing 8 on its protruding end, and it is interiorly threaded to receive bolt 6.

The invention is applicable to new wheels or to wheels that have been in use, and the manner of applying it to new wheels is obvious from the drawings and the nature of the device.

In applying the device to old wheels holes are preferably bored through the tire at the conjunction of felly-sections and are continued through the felly. Afterward the hole through the felly is reamed out to conform to the taper of the nut 7, and such reaming may be conveniently effected by attaching a reamer to the end of the boring-bit extending through the felly and reversing the motion of the bit. The tapered hole that receives the nut is smaller at its greatest diameter than the greatest diameter of the nut, and when the device is first applied to the wheel the large end of the nut protrudes inward beyond the felly, as shown in Fig. 2, and the ends of the felly-sections abut. When the tire becomes loose through wear or shrinkage of the felly, the bolt 6 is held against turning, and the nut 7 is screwed inward onto the bolt. As the nut is turned on the bolt it acts as a rotating wedge against the inclined surfaces of the fellies, forcing the abutting ends of the felly-sections apart, and thereby tightening the tire.

It is preferable to place one of my tightening devices at each conjunction of the felly-sections; but the operation of each is the same as every other, and the principle of my invention is apparent from the one tightener shown in the drawings.

The rotary motion of the wedge facilitates the spreading of the felly-sections apart, and when the tire is once tightened the pressure against the wedge prevents back rotation.

I claim—

1. In a tire-tightener, the combination with the tire and felly of a wheel, of a bolt set through the tire and into the felly, at the conjunction of the felly-sections, and a conical nut extending into and between the felly-sections and engaging the bolt, substantially as described.

2. In a tire-tightener, the combination with the tire and felly of a wheel, of a screw-head bolt set through the tire and into the felly at the conjunction of the felly-sections, a conical nut extending into and between the felly-sections and engaging the bolt and a wrench-seat on the protruding end of the nut, substantially as described.

In testimony whereof I sign my name in the presence of two subscribing witnesses.

JOSEPH B. SMITH.

Witnesses:
 FRANK I. MITCHELL,
 L. G. PULLEN.